United States Patent
Tormasov et al.

(10) Patent No.: US 7,665,090 B1
(45) Date of Patent: *Feb. 16, 2010

(54) SYSTEM, METHOD, AND COMPUTER PROGRAM PRODUCT FOR GROUP SCHEDULING OF COMPUTER RESOURCES

(75) Inventors: Alexander G. Tormasov, Moscow (RU); Serguei M. Beloussov, Singapore (SG); Stanislav S. Protassov, Singapore (SG)

(73) Assignee: SWsoft Holdings, Ltd. (BM)

( * ) Notice: Subject to any disclaimer, the term of this patent is extended or adjusted under 35 U.S.C. 154(b) by 1070 days.

This patent is subject to a terminal disclaimer.

(21) Appl. No.: 10/793,881

(22) Filed: Mar. 8, 2004

(51) Int. Cl.
*G06F 9/46* (2006.01)
(52) U.S. Cl. .................................. 718/104
(58) Field of Classification Search ............ 718/104
See application file for complete search history.

(56) References Cited

U.S. PATENT DOCUMENTS 6,654,780 B1 * 11/2003 Eilert et al. ............... 718/104
6,909,691 B1    6/2005 Goyal et al.

* cited by examiner

Primary Examiner—Meng-Ai An
Assistant Examiner—Eric C Wai
(74) Attorney, Agent, or Firm—Bardmesser Law Group

(57) ABSTRACT

A system, method and computer program product for managing computer resources in a computer system running an operating system and a plurality of processes grouped into at least two groups. A set of resource limits corresponds to the processes. A scheduler of resource allocation allocates resources to each process such that total resource allocation to a group to which that process belongs remains constant. The resources comprise, e.g., network bandwidth, number of network connections, I/O bandwidth for peripheral devices, number of operations in a period of time for service operation with countable requests for service, number of operations in a period of time for a daemon with countable requests for service, permission for execution of operation, number of security descriptors, and number of terminals. The scheduler reallocates the resources based on a predictive algorithm, or based on process priority, or based on relative weighting of the processes. The scheduler can adjust an increase and a decrease of the resources available to a particular process. The scheduler is capable of increasing a resource allocation restriction to one process by and by waiting for that resource to become available. The scheduler is capable of increasing a resource allocation to one process by reducing allocation restriction to other processes in the same group on a basis proportional to their current use of that resource. The scheduler can reduce a resource allocation to a particular process based on a history of consumption of the resource by that process and a history of consumption of other resources by that process.

50 Claims, 6 Drawing Sheets

SYSTEM, METHOD, AND COMPUTER PROGRAM PRODUCT FOR GROUP SCHEDULING OF COMPUTER RESOURCES

BACKGROUND OF THE INVENTION

1. Field of the Invention

The present invention is directed to computer system resource management, and more particularly, to resources management for a group of objects or processes in a computer system, where each object or process has individual resources limitations.

2. Related Art

A typical computer system has a wide variety of resources that may be utilized by its consumers. These resources are typically used in order to service the needs of the users of the computer system, for example, to enable functionality of a web server or a virtual private server, to provide data from a database to various users, to provide user access to a network, etc. Normally, consumers of the resources of the computer system are processes or threads being executed in a computer system, which require for their operation shares of CPU time, memory, operating system objects, semaphores, disk access, network access, etc. Consumers of the resources may also be a group of processes and applications, virtual private servers, users, groups of users, system services and daemons, etc.

Normally, the process of allocating resources between consumers is handled by a specific code within the operating system, usually referred to as a planner or scheduler. The scheduler may be separated out into its own subroutine, or it may be spread out in various places in the code of the operating system and the user programs. A set of schedulers for different kinds of resources or different scheduling algorithms can also be used. Upon allocation of a particular resource, the scheduler takes into account a number of aspects—for example, current utilization of that resource by a consumer, recent requests for that resource's use, system load, history of that resource's use, limits imposed on the use of that resource for a particular consumer and for all the consumers, service level agreement (SLA) guarantees for that particular consumer or user, operating system requirements, priority among the various processes and users, penalty introduced during reallocation of resources, etc. A request to the scheduler for reallocation of the resource can originate both at the moment when the consumer attempts an operation on that particular resource, and periodically, using predictive mechanisms that address prospective resource use. A number of algorithms exist for managing resource allocation. For example, classical scheduling algorithms for CPU time can include both dynamic and static priority schemes, round robin schemes, multiple queues, guaranteed scheduling, shortest job first, lottery scheduling, real time scheduling, two-level scheduling, and so on.

Most modern operating systems have a built-in mechanism for managing quantitative resource consumption level. Examples of such mechanisms are "rlimits" in UNIX type operating systems, or a scheme of prioritizing execution of threads and processes in Microsoft Windows. The limitations imposed by these mechanisms can be placed on a single object that consumes resources, for example, on a process or a thread, but usually not on a group of processes.

Thus, the present invention is directed to a method of solving the problem of managing resource use on a group basis in addition to managing resources on an individual process basis.

SUMMARY OF THE INVENTION

The present invention is directed to a system, method and computer program product for group scheduling of computer resources that substantially obviates one or more of the problems and disadvantages of the related art.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, there is provided a system, method and computer program product for managing computer resources in a computer system running an operating system and a plurality of processes. The processes are grouped into at least two groups. A set of limits and/or SLA guarantees (collectively guarantees and limits will be referred to as "restrictions") corresponds to the processes. A manager, or scheduler, of resource allocation restrictions allocates resources to each process such that total resource allocation restrictions to a group to which that process belongs remains constant. At least one of the processes comprises a plurality of threads, or may contain single thread. The manager allocates resources of a renewable type or a non-renewable type. The resources of the renewable type comprise any of CPU/CPUs shares, network bandwidth, number of network connections, I/O bandwidth for peripheral devices, number of operations in a period of time for service operation with countable requests for service, number of operations in a period of time for a daemon with countable requests for service, permission for execution of operation, number of security descriptors, number of terminals and optionally other resources. The resources of the non-renewable type comprise any of disk or other permanent storage space allocation size, number of files, number of operating system service structures for servicing user requests, buffer size, network traffic, number of users, number of groups of users, virtual and other kind of computer memory, and physical memory, and optionally other resources. The manager reallocates the resources and/or resources restrictions based on a request for resources over an established limit, or based on a predictive algorithm, or based on process priority, or based on relative or absolute weighting of the processes or/and execution threads and optionally on other reasons. The manager can reallocate to one of an increase and a decrease of the resources restrictions or resources itself available to a particular process. The manager can reallocate the resources restrictions so as to exceed the resource allocation restrictions to a particular process while keeping the resource allocation restrictions to the group to which that process belongs constant. The manager is capable of increasing a resource allocation restrictions to one process by one of forcing a reduction in an allocation restrictions to another process and by waiting for that resource to become available. The manager is capable of increasing a resource allocation restrictions to one process by correcting (e.g., reducing) allocation restrictions to other processes in the same group on a basis proportional to their current use of that resource or current resource allocation restrictions. The manager can correct a resource allocation restrictions or resources to a particular process based on any of a command from the operating system, a current consumption level of the resource by that process, a history of consumption of the resource by that process, a level of consumption of other resources by that process, a history of consumption of other resources by that process, or on other factors. The system also includes a storage of the resource restrictions and/or current resources utilization level accessible by the manager. The storage is any of a database, a data structures in a memory, and file on a disk.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
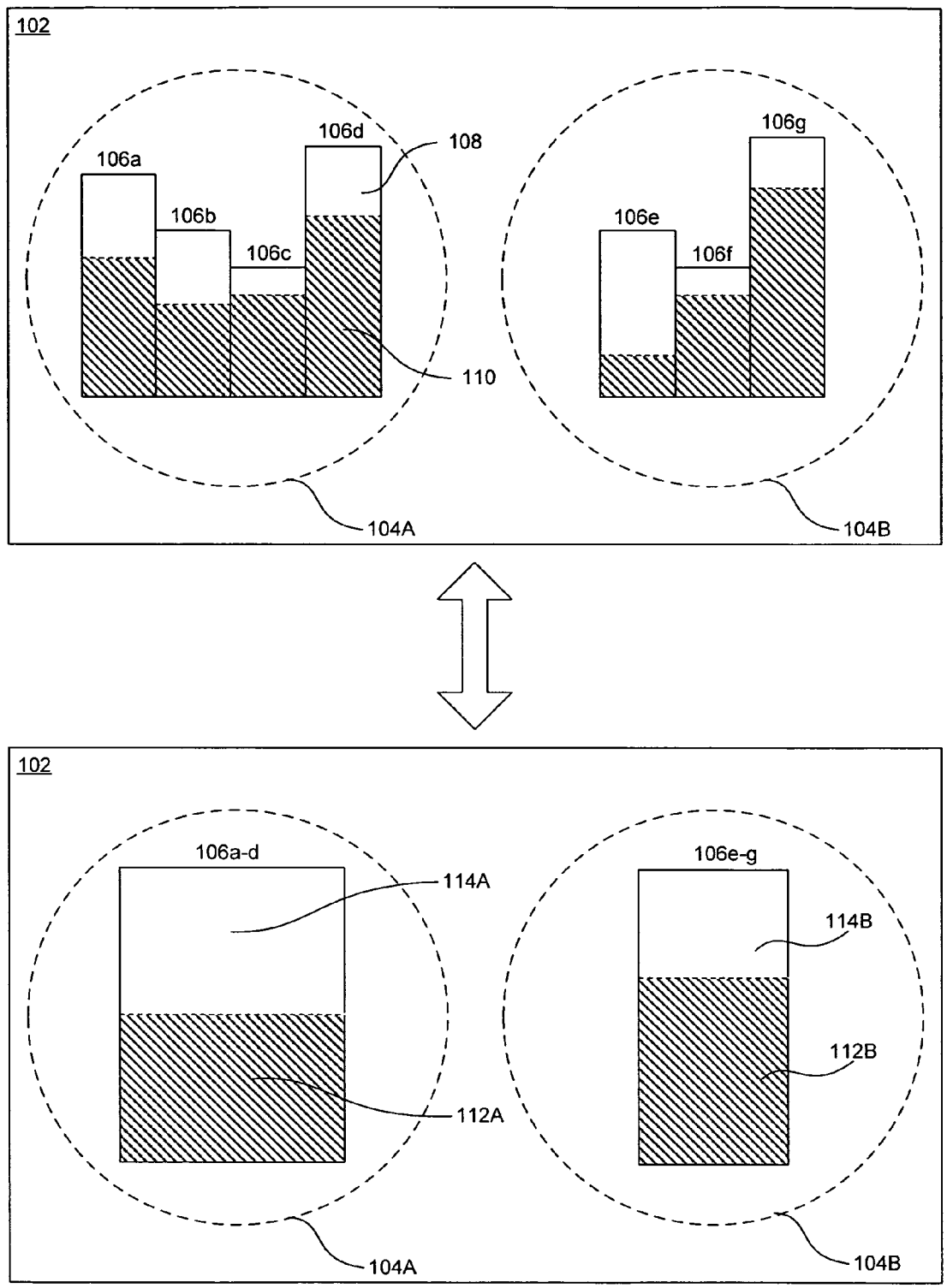
FIG. 1 illustrates how processes and resources used by those processes may be grouped.

Reference will now be made in detail to the preferred embodiments of the present invention, examples of which are illustrated in the accompanying drawings.

The present invention is directed to resource management for a group of objects or processes that are treated, in some sense, as a logical grouping of processes.

The resources of a computer system, as they relate to algorithms that manage their use, may be divided into two types—renewable and non-renewable types.

Resources of a renewable type need to be distributed between their consumers, and these resources are always available. Examples of such resources are shares of CPU/CPUs time, network bandwidth, number of network connections, I/O bandwidth for various devices (disk drives, video, computer bus, controllers), number of operations in a period of time for a particular device, number of operations in a period of time for a service, daemon or other operations with countable requests for service, permissions for execution of certain types of operations, number of network or firewall rules, number of security descriptors, number of active terminals, etc.

At any moment in time, when a need for a particular resource consumption arises, the computer system knows that such a resource exists, and only needs to decide to whom that resource should be given. Later, it needs to decide whether and to whom that resource should be reallocated. For example, when a number of threads are being executed, it is only necessary to decide to which thread and what proportion of CPU time should be allocated.

In this case, in order to reallocate a particular resource, there is no need for complex operations for freeing up that resource. At the same time, the reallocation of resources may also be accompanied by externally imposed limitations or penalties for their reallocation. Thus, for example, when planning an allocation of CPU usage on a computer with multiple CPUs, it may be necessary to take into account that the transfer of one thread from one CPU to another can involve a certain amount of overhead in the switching of the execution context (the term "CPU affinity" is frequently used to describe this situation).

Resources of the non-renewable type include disk space, number of files and other file structures of the file system, number of service structures of the operating system that are associated with servicing the consumers of the resources, buffer size, network traffic, number of users and groups of users, different types of computer memory—e.g., virtual memory, physical memory, etc., physical resident memory occupied by processes and threads of the users, etc. When a need arises to allocate such a resource to a consumer, it is necessary to take certain steps to free up that resource. A well-known example of such a situation is a request for physical (or resident) memory page, which is currently occupied (used) by a particular process. A processor cannot begin to executing code of the particular process until that code is loaded into memory. Therefore, before a process can begin execution, it must receive its share of the physical memory from the operating system. This may be accomplished by the operating system by taking an appropriate portion of the memory from another process, for example, using "swap out" of appropriate areas from a physical memory onto a disk (often referred to "page file" or "swap file").

Another example of non-renewable resources are resources that for most purposes cannot be taken away from the consumer. Such resources can only be allocated from a pool of resources, which has a finite size. An example of such a resource is disk space, which, for all practical purposes, cannot be freed up upon request, due to the fact that this would require removal of the files stored on that disk, which is usually unacceptable. In other words, such resources can only be reallocated or allocated from a pool only until that pool does not run out of that particular resource (for example, in the case of disk space, that pool may be a physical disk with a logical partitioning scheme).

There are also certain "intermediate" resources, when the same resources under some circumstances are treated as renewable resources, and under other circumstances are treated as non-renewable resources. An example of such an intermediate resource is a file system disk cache. If the file system disk cache is not completely full, and does not contain "dirty pages" that need to be pushed out onto a disk, then, when necessary, data may be stored in the file system disk cache virtually immediately. However, if it is completely filled up with dirty pages, then, before replacing a particular page with a new page, it is necessary to perform relatively lengthy and complex operations for "dumping" its old contents onto a disk.

For example, consider the situation where the operating system permits limiting each process to a particular amount of virtual memory used by that process. It may be desirable to be able to limit the total amount of a resource used by a particular group of processes, for example, use of virtual memory by a particular group of processes. Note that these processes may exist either in a user mode, or in an operating system kernel mode. For instance, in the case of virtual memory, consider the case where there are three processes, of which one is using one megabyte of memory, another is using two megabytes of memory, and a third is using three megabytes of memory, for a total of six megabytes of virtual memory used by these three processes. The limit per process may be four megabytes, for a total of 12 megabytes total maximum use of virtual memory for these three processes. Here, only six megabytes are used, leaving six megabytes unused. The process that currently utilizes three megabytes of memory may suddenly require the use of five megabytes. If four megabytes were a hard upper limit for that process, then that process would not be permitted to use five megabytes, and the request would be denied. However, if these three processes are logically grouped into a set (or a group of processes), the third process may be allowed to utilize more than its limit of four megabytes, because there is underutilization by the other two processes. The other two processes would need to have their memory allocation limit reduced somehow, although in this example, since they are both under-utilizing their resources, this would be transparent to them.

Any number of strategies may be utilized to reallocate resources in this manner. For example, one strategy is an "on demand" strategy, where the operating system waits for a process to attempt to exceed its resource allocation, and then checks whether there is under-utilization of that resource for that group or set of processes and then distribute the remainder (i.e., the underutilized) of the resources between active consumers.

Another strategy may be periodic checks of resource use, where the operating system checks on utilization of resources of all or some subset of the processes, and reallocates the resources as necessary, assuming that resources are available to be reallocated for that group of processes.

Additionally, the resource re-allocation may be accomplished in a number of ways. For example, resources may be taken from one process in a group, and given to another process in the same group. Alternatively, several processes in a group may have their resource allocation reduced proportionately to current utilization level, with the balance given over to one process that requires additional resources. Alternatively, the resources may be reallocated from several processes in a group of processes, based on some externally-imposed criteria, for example, based on current level of utilization, or past history of utilization, etc.

In the conventional approach, to accomplish this, one scheduler (or a resource allocation manager) can be placed on top of another scheduler for limited set of resources types and limited set of operational systems.

The present invention permits the use of a simple add-on, where only a single scheduler per OS is used, without the complexity of having multiple layers of schedulers inside the operating system.

Note that the present invention permits this approach to resource management for any resource allocated by the operating system, not just some subset of resources.

FIG. 1 illustrates how processes and resources used by those processes may be grouped. In FIG. 1, 102 designates a computer system, within which a plurality of processes 106a-106g are running, and which are utilizing a particular resource. Examples of such a resource being utilized by the processes 106a-106g may be CPU use, virtual memory use, network bandwidth, disc space, IP addresses, etc. For each such process, the dashed portion (110) is the amount of the resource utilized by that process, and the clear portion (108) is the remaining (unutilized) portion of the total resource allocated to that particular process (for example, to process 106d). The sum of 110 and 108 gives a current limit of resource utilization allocated for this process. (In this description, guarantees and limits will be referred to collectively as "restrictions.") 104A is a logical grouping of processes 106a-106d, and 104B is a logical grouping of processes 106e-106g. The bottom diagram shows how resource use for each process group 104A and 104B may be grouped together. In the bottom half of FIG. 1, 112A and 112B represent total resource utilization by process groups 104A, 104B, respectively. 114A and 114B designate remaining (unutilized) resources by the processes groups 104A, 104B. 112 and 114 together represent the total amount of resources available to that particular group of processes, with the reserve 114 being available for utilization by any of the processes within that group, so that total resource allocation to that group remains the same. Note that the top and bottom diagrams are different representations of what occurs at the same point in time.

Thus, FIG. 1 shows how a number of objects/processes 106 may be grouped together logically, based on some consideration by a scheduler (see 302 in FIG. 3), and how it is desirable to manage their resource utilization on a group basis, as opposed to on an individual process basis.

Figure 2:
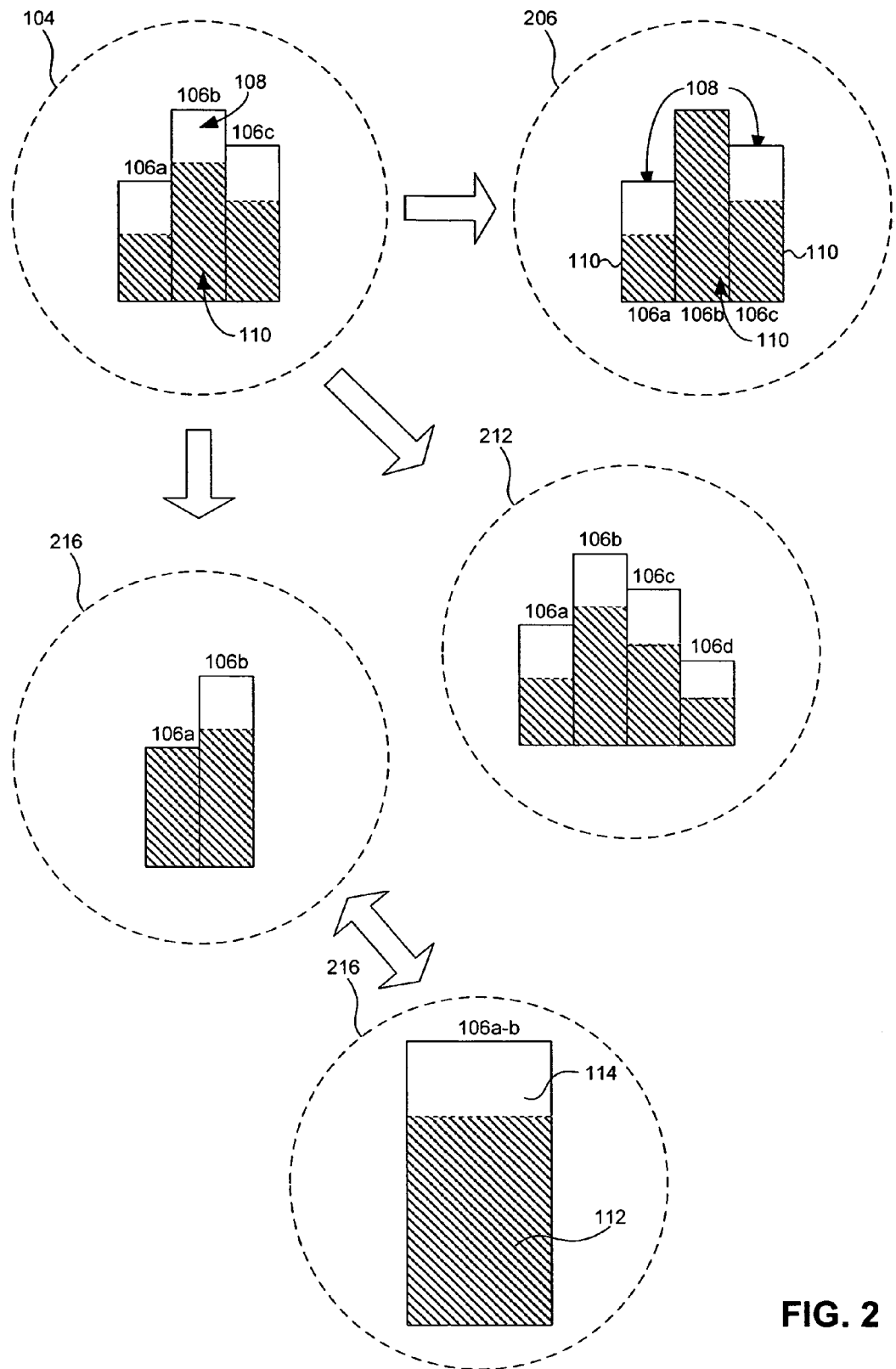
FIG. 2 illustrates how an initial state of resources allocation for a group of processes can evolve over time.

FIG. 2 illustrates several possibilities of how an initial state of the group of processes 104 can evolve over time into, for example, states 206, 212 or 216. For example, comparing state 206 with the initial state 104, the process 106b is now utilizing all of its available resource, while processes 106a and 106c are utilizing the same amount of resource as before. Thus, with regard to state 206, it may be desirable to assign some of the available resources from processes 106a and/or 106c to process 106b, which is bumping up against its resource utilization limit.

Note that in the case of situation 216 of FIG. 2 one of the processes has been terminated and overall resource usage will change. Examples of such a situation can be limits on virtual memory use, where, upon termination of one of the processes in the group, the total virtual memory used by the group of processes will be reduced. Note that underutilization of resources is usually not treated as a problem and does not need to be "fixed", the more critical problem that usually needs addressing is over-utilization.

In the state 212, the resource utilization by the three processes 106a, 106b, 106c is the same as in the initial state 104, but an additional process 106d has been "born" and attached to (associated with) the current group, thereby increasing total utilization by this group of processes. Thus, in this case, either total resource amount allocated to that group needs to be increased, or the resource allocation limit to each process may need to be decreased, to account for the process 106d.

State 216 shows a higher utilization of the resources by process 106a, the same utilization of the resource by process 106b, and a termination of process 106c, which potentially permits an allocation of more resources to the two remaining processes than their otherwise-assigned limits would normally allow. The diagram at the bottom illustrates the same state 216, where the resource utilized by both processes 106a and 106b are combined, showing the utilized resources 112, and the unutilized resources 114. In the case state 216, with one of the processes terminated, the total resource consumption by that group of processes is therefore less, which can permit reallocation of resources to other groups of processes. In the case of state 212, the situation is the opposite—an additional process has been initiated, and may require an increase in the resource allocation to the group of processes.

Figure 3:
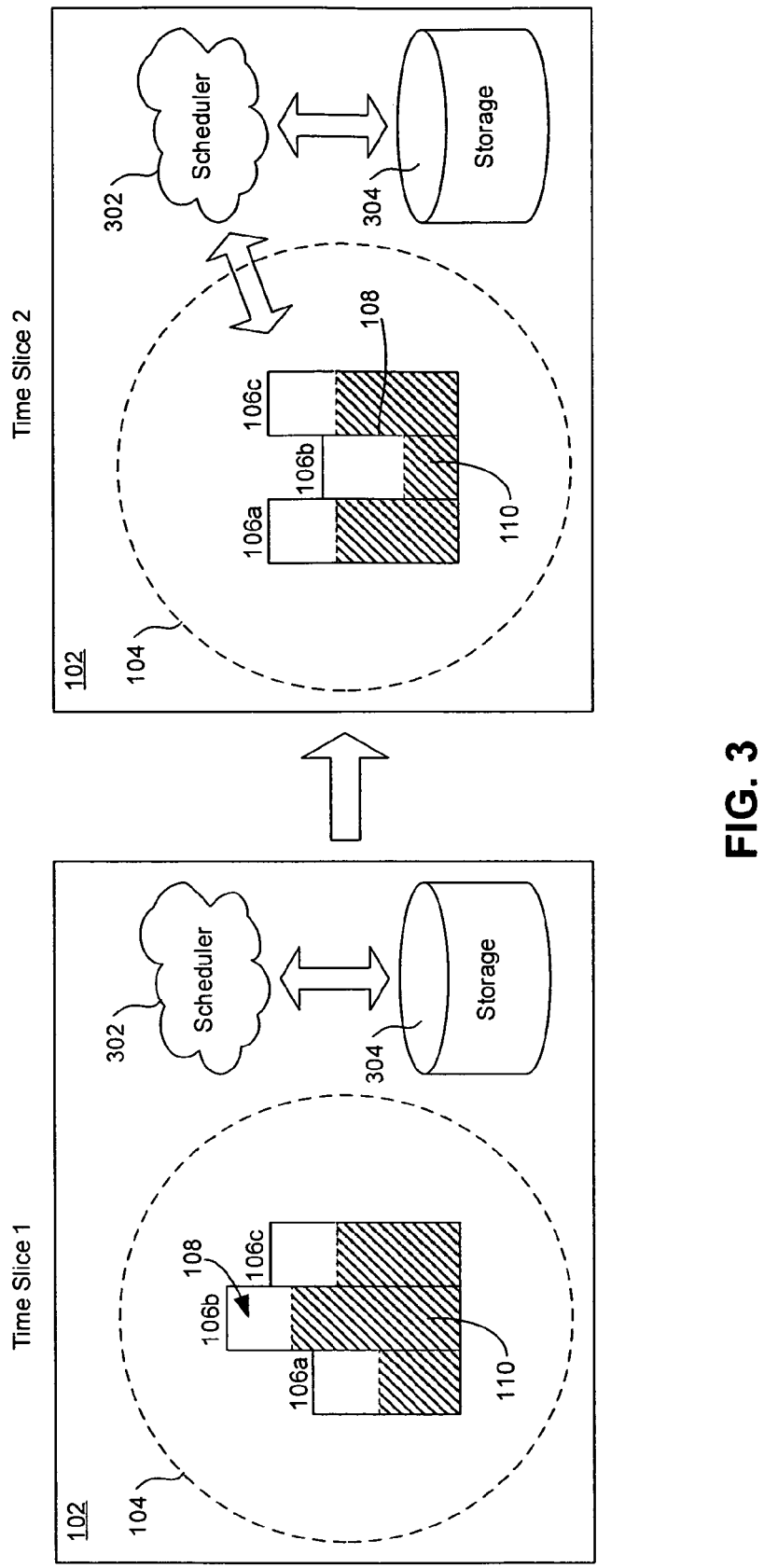
FIG. 3 illustrates use of a group resource scheduler for managing resource allocation to a group of processes.

FIG. 3 illustrates the use of a group resource scheduler 302 for managing resource allocation to a group of processes 104. The scheduler 302 uses a storage 304, which may be, for example, a database for managing the resources of each group of processes and of each process within a particular group 104. The scheduler 302 is responsible for keeping track of the resource utilization on a group basis of each group of processes 104 and of each process 106 within the group 104, as well as the amount of under-utilized resources by each process and each group of processes, and have access to information about the set of particular processes and threads that belongs to the groups of processes it is managing.

The present invention uses the scheduler 302, which stores the current level of consumption and consumption limits of the group of processes 104. Some of the processes within the group of processes 104 may be left "untouched," so that any underused or unused reserves of the resources of the group of processes 104 can be utilized by other objects or processes within the group 104, when the need arises. Thus, the scheduler 302 can manage the resource used by the group of processes 104 such that while total resource allocation for the group of processes 104 remains unchanged, the relative allocation within the group of processes 104 is manipulated by the scheduler 302.

The scheduler 302 needs to have a storage for its data, where current use metrics by the processes are stored, together with resource limitation numbers, weights, history of resource utilization, etc. Storage 304 may be located on disk, in operating system kernel or user mode memory, in a database, on an external server, etc., depending on the implementation of the scheduler 302.

The scheduler 302 can act periodically (e.g., timer-based), without waiting for an event connected to alteration or a change in resource consumption. For example, algorithms for swapping virtual memory pages can be active during inactivity of the operating system processes, swapping out dirty pages "in advance" without an explicit request for freeing up space in the buffer. This permits reducing load on the disk storage system, and particularly, on the mechanisms that transfer data from the disk into the memory, during peak use. Such algorithms may be said to be predictive in the sense that they manipulate resource allocation in advance of actual request, based on a certain understanding of how such resources may be used in the future. At the same time, even with such algorithms, the scheduler 302 can postpone reallocation of the resources towards a later time periods.

Shown in FIG. 3 is the evolution of the state of resource utilization from time slice 1 to time slice 2, where process 106a has been allocated more resources, and is using more resources at time slice 2 compared to time slice 1. Process 106b has been allocated less resources, and is utilizing less resources than before. For process 106c utilization of resources is unchanged from time slice 1 to time slice 2. The scheduler 302 is responsible for managing the resource allocation between the processes 106 and between the groups of processes 104, and for storing the information about the resource utilization in the storage 304.

Thus, the concept of the group of processes exists with reference to the scheduler 302, and there is no need to create a logical grouping of such processes as an operating system concept. The scheduler 302 is sufficient to manage such logical groupings.

Figure 4:
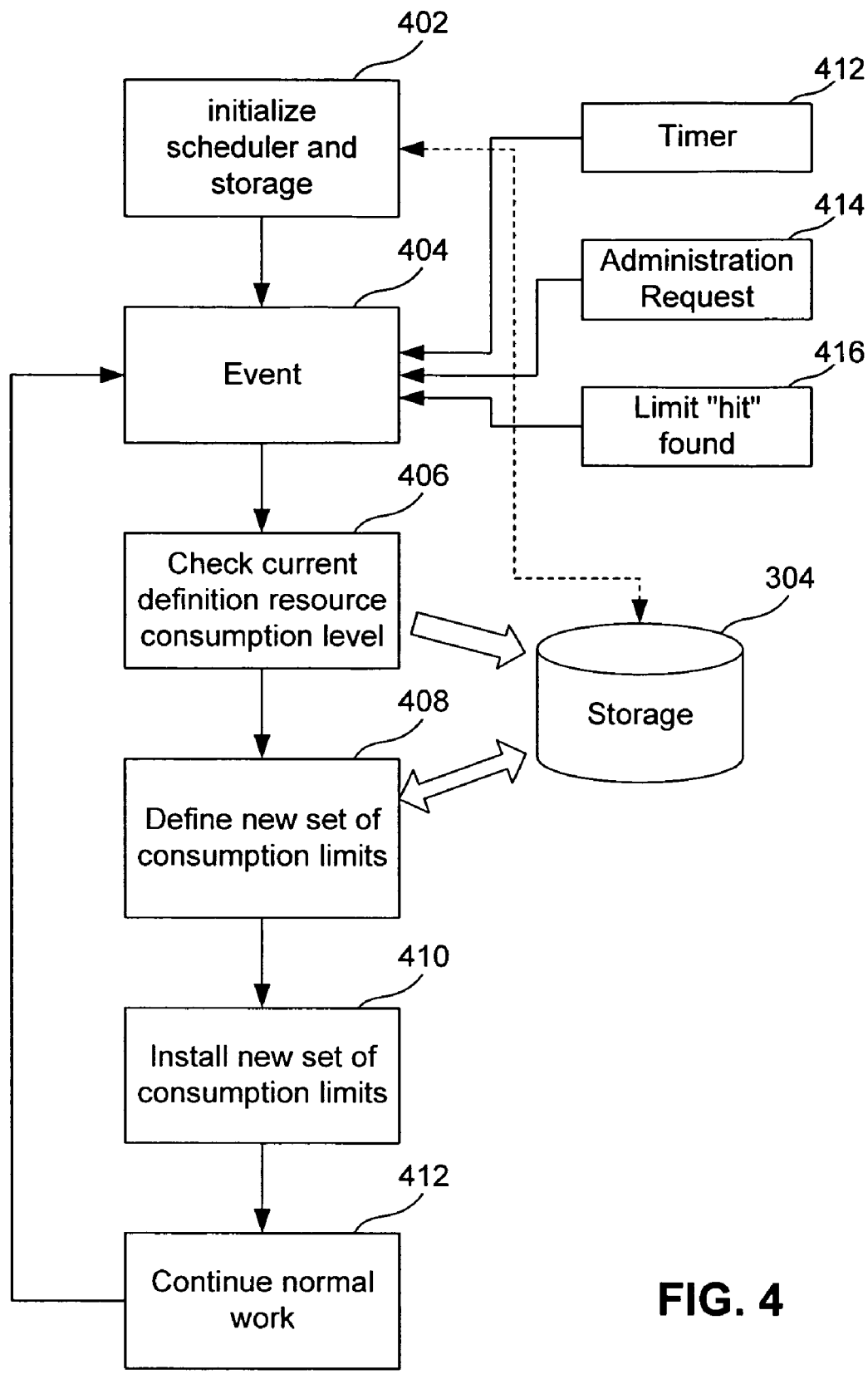
FIG. 4 illustrates a process of managing resource allocation according to one embodiment the present invention.

FIG. 4 illustrates a process of managing the resource allocation according to the present invention. As shown in FIG. 4, in step 402, the scheduler 302 and storage 304 are initialized. As noted above, the storage 304 may be a database, or may be a set of data records kept in operating system kernel space or in user mode space.

In step 404, an event occurs that requires the scheduler's attention and potentially a reallocation of resources. Such an event may be a timer 412 (in other words, periodically, the scheduler 302 re-examines the state of the processes, groups of processes, and, if necessary, reallocates the resources). Another type of an event may be an administrative request 414 by a system administrator, where the system administrator (or administration scripts) either increases or decreases the resource allocation (e.g., disk quota amount, process priority, birth or death of a process, etc.) to a process or a group of processes. Another type of event may be hitting a limit of the resource allocation by a particular process detected, for example, by the OS kernel (416).

In step 406, the scheduler 302 gets the current definition of resource consumption levels from the storage 304 (in other words, the scheduler 302 retrieves the current resource allocations to the relevant processes and/or groups of processes). Note that in some cases, it is possible to avoid step 406, for example, in a round robin periodic resource reallocation scheme. In step 408, a new set of resource consumption limits is defined by the scheduler 302, based on whatever algorithm is defined by the system administrator. In step 410, the new set of resource consumption limits is installed, and the computer system 102 proceeds with normal operation (step 412). The process may then return to step 404.

Alternatively, the administrative request 414 may be due to a user request for more resources, or due to additional processes "being born".

Thus, this process allows an increase in the resources allocated to a particular process even when its nominal upper limit does not permit such an increase. This can occur, for example, when other processes that form a logical group to which this process belongs are under-utilizing their resource allocations. Note that the particular scheme for resource utilization and allocation within a process group and between process groups may depend on the nature of the resource in question. For example, in the case of CPU usage, this resource can be easily allocated and reallocated between the various processes and groups of processes. On the other hand, in the case of disc storage space, it may not be as easy to take, for example, nb megabytes from one process and give it to another, because the first process could have files already stored there, etc. Accordingly, an algorithm that reallocates the resources needs to take into account the nature of the resource in question. Also, the scheduling algorithm can allow some consumers to use more resources that a declared in upper limit if such resources are available, or if due to some reasons (e.g., commercial or sales reasons or due to overall optimization of execution of computer system) it is worth to give such an ability to consumers (i.e., relaxed checking of upper limits, or soft upper limits).

Figure 5:
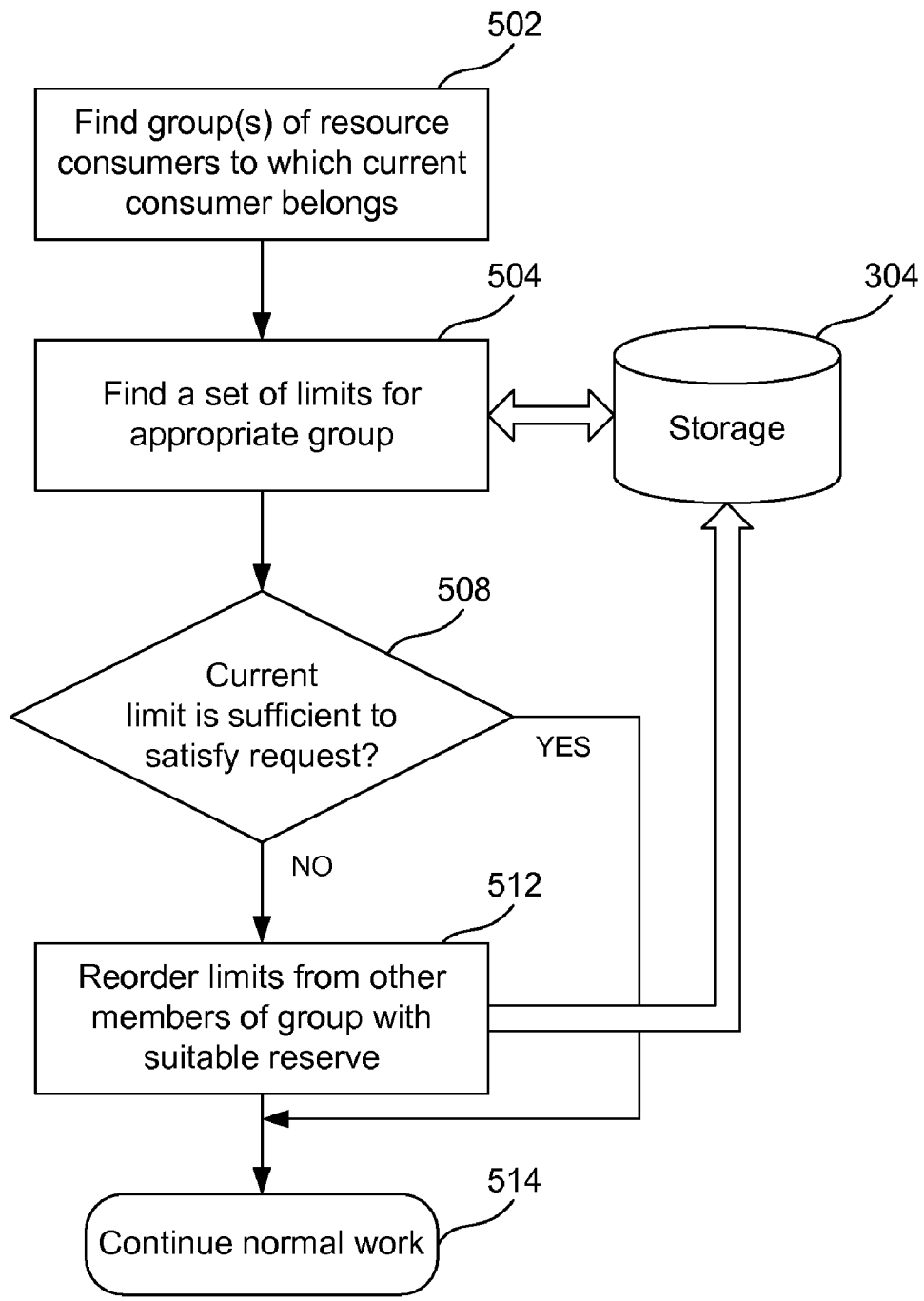
FIG. 5 shows a process of a resource scheduling for a particular group.

The process of a resource scheduling for a particular group typically involves the steps illustrated in FIG. 5, in order to maintain overall group resource allocation limit constant while manipulating resource allocations of the individual processes within the group. As shown in FIG. 5, first, in step 502, the scheduler 302 identifies a group or groups of consumers to which the current consumer (in other words, the consumer requesting the use of a certain resource, or a reallocation of a certain resource) belongs. In the next step 504, the scheduler 302 identifies a set of limits for the group of processes to which the current consumer belongs, using the storage 304. The scheduler 302 then checks to see if the current limit on resource use is sufficient to satisfy the request. If the current limit is insufficient, then the scheduler 302 reorders limits from other members of the group that have a suitable reserve of that resource. The scheduler 302 then continues with normal work. If the current limit is sufficient to satisfy the request, then the scheduler 302 proceeds to step 514 directly. In step 514, the resource may be allocated by the operating system as well, which can give that resource to the requesting user. Otherwise, for example, the scheduler 302 can change the current limitation for that user, while maintaining total resource use for that group constant. If there are no resources that can be given to the requesting user, or if the reserves, for whatever reason, cannot not be reallocated, then the scheduler's behavior will be determined by whatever algorithm exists for handling a situation of receiving a resource request that cannot be met. Normally, in that case, the resource will not be allocated, although other possibilities exist.

The decision of how to reallocate resources from other consumers to the requesting consumer are based on the scheduler's 302 algorithm. For example, it is possible to use an algorithm that increases or decreases all the reserves (depending on the requesting operation—increasing or decreasing the level of resource consumption) proportionately to their current utilization. It is also possible to change the level of consumption in fixed quanta. It is also possible to change the values of the resource limitations only for a particular subset of the users of the group of processes 104, either randomly, or based on predefined or calculable criteria.

In the scheduling process, the scheduler 302 can take into account not only those resources that are being used at the moment that are being requested in the current request, but also system-level factors, level of consumption of other resources by the same group, history of use, etc. For example, if a cache exists and is associated with data of a particular consumer, then the decision of whether or not to increase that consumer's cache size may be based on overall use of the memory by the operating system objects and on availability of free memory that does not directly associated with the cache (for example, free memory or memory occupied by other processes) and which may be freed up with low overhead.

The history of resource use can be used for predicting resource consumption level in future time periods. The scheduler 302 can also use resource consumption of different resources to predict the resource consumption of the resource being requested.

Limitations on the resource use may be absolute (for example, a given process is permitted to use no more than 100 megabytes of virtual memory), or they may be relative (for example, a given thread can receive a priority above normal, or +1 relative to a "base priority," or may use no more than 30% of channel bandwidth). Also, weighting coefficients can be used. For example, if one process has a relative weight of 1,000 units, and another process has a relative weight of 2,000 units, then, all other things being equal, the first process will receive half as much resource allocation as the second process for a particular time slice, depending on the number of CPUs and other conditions.

Additionally, the resource limitations may be in effect permanently, or may be in effect until a certain event occurs. For example, a hard disk quota for a particular user may be specified as 100 megabytes, which cannot be exceeded under any circumstances. Alternatively, the 100 MB limitation may be temporary. For example, the user may be allocated 80 megabytes of storage without any limitations, and up to 100 megabytes of storage for a particular time period (e.g., for two days), and may not exceed 100 megabytes under any circumstances. This is an example of a combination of soft and hard disk quotas.

The process of imposing limitations on resource use also can take different forms, depending on the particular operating system implementation. The limitations may be used only at the moment of attempting to allocate a particular resource, and can simply involve denial of the request if that request does not fall within the range of allowed values (this is frequently how the process of requesting additional memory or CPU time allocation works). The process can also involve a forced reallocation of the resource from one user to another. This may occur when a system administrator decides that a particular process must take up less physical memory, and the operating system forces an immediate swap out of the resident memory pages for the particular process. Also, systems exist where such limitations are not hard limitations, but may be "recommended" limitations in order to select an optimum load pattern. In other words, the imposition of limitations may not be mandatory if the particular resource is available. For example, if there is a possibility of using of certain memory buffers for caching disk requests, and there are no other consumers of the cache, then even with the limitations on cache use, the operating system can nonetheless allow the user to keep data in the cache above that user's limitation. In this particular situation, the limitations may be re-imposed later by the operating system. For example, the limits on disk I/O bandwidth for a particular user can be taken into account by the operating system at the moment of periodic swap-out of the dirty pages from the buffers onto a disk.

Often such limitations cannot be imposed on a group of objects, but only on each individual object, even though a need for such a group based imposition of resource limitations exist. For example, when servicing virtual private servers, there may be a need for managing resource use of all the processes and threads and other objects as a group, where that group is associated with a particular VPS. This is necessary in order to have the capability of maintaining a certain level of resource allocation that is guaranteed by a service level agreement (SLA). However, frequently the problem is in that such resource limitations are often implemented deep within an operating system, and altering the operating system code is impractical either due to complexity and cost of such a change, or because of the proprietary nature of the operating system code.

Furthermore, consider the following situation regarding specific resources: some portion of resident (physical) memory is used by a first process. When a second process requires additional physical memory and, therefore, some physical pages that belong to the first process should be swapped out, the scheduler takes into account, as its first priority as a swap-out candidates, only those processes whose actual utilization of physical memory (or working set) is bigger than installed guarantee value for process. If a process doesn't use its full quota of physical memory and has not requested it, this additional "reserve" need not be preserved, but can instead be used by any other process requiring this resource. After a request from the second process for more pages, this resource will be freed and given to appropriate consumer (here, the second process).

In such a case, the "guarantee" values can be considered by scheduler only as "recommended," values, rather than "mandatory", and might not be satisfied 100% of the time (this is an example of "relaxed" guarantees).

A similar situation can occur with weights—usually weight is treated as a relative, and a new object can always be added with any weight so as not to disturb overall weight distribution. The only problem for a group of processes is that if a weight of group is treated as a sum of all weights of all members (processes) of the group, then if a group member is added or removed, the weights for other members of the group should be recalculated.

One of the advantages of the invention is the ability to implement the scheduler 302 as an add-on to the operating system, or as a service or a daemon in user space. The proposed system of resource allocation uses limitations that already exist within the operating system, and have been implemented in the original operating system in order to enable a group level resource management allocation, which permits satisfaction of service level agreements for many modern enterprise and data center systems. This is accomplished without substantial costs involved in rewriting operating system code. The proposed implementation is also flexible, and permits implementation of virtually any scenario of resource management for virtually any resource.

Figure 6:
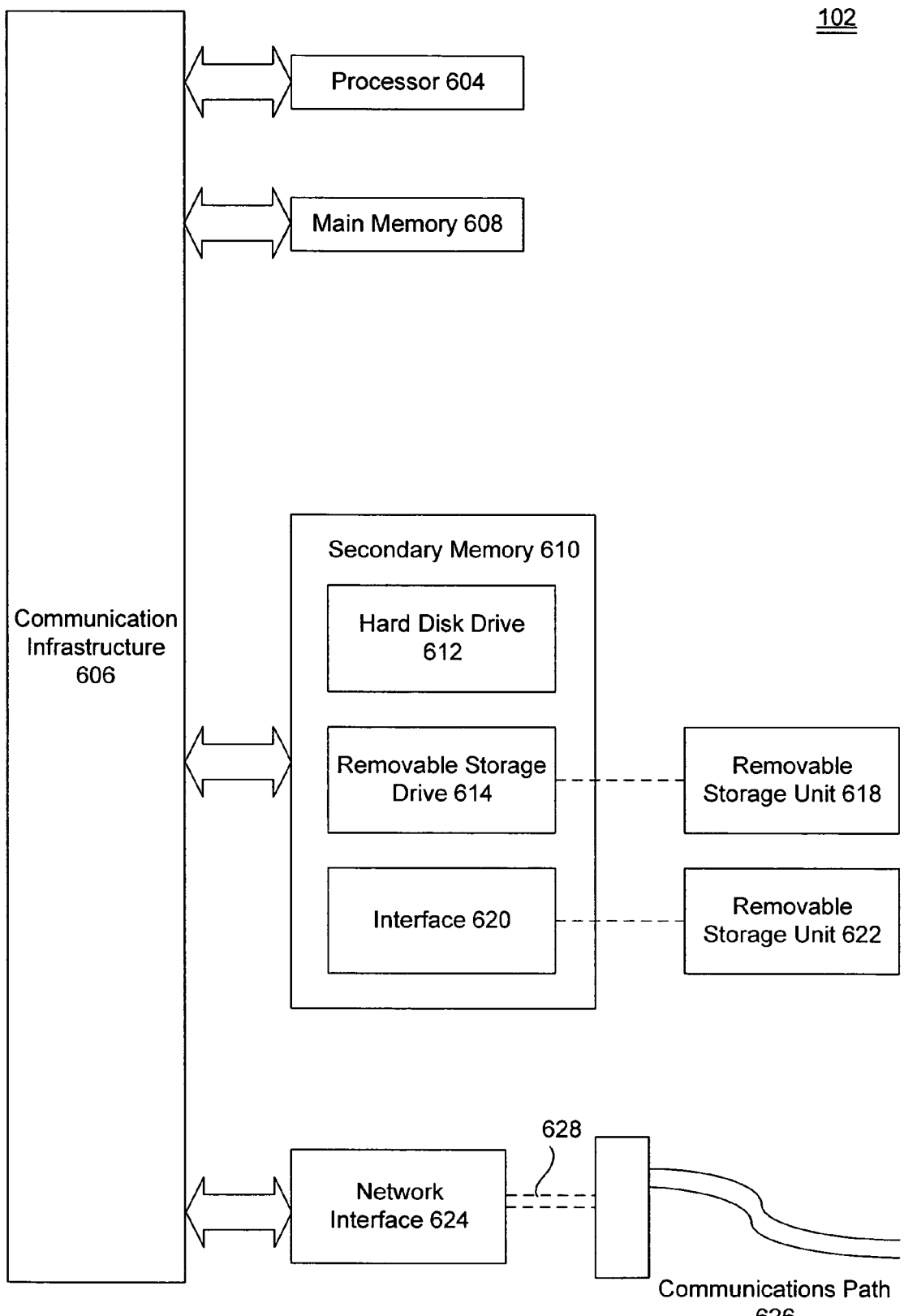
FIG. 6 shows an example of a computer system where the present invention may be used.

An example of a computer system 102 where the present invention may be used is illustrated in FIG. 6. The computer system 102 includes one or more processors, such as processor 604. The processor 604 is connected to a communication infrastructure 606, such as a bus or network). Various software implementations are described in terms of this exemplary computer system. After reading this description, it will become apparent to a person skilled in the relevant art how to implement the invention using other computer systems and/or computer architectures.

Computer system 102 also includes a main memory 608, preferably random access memory (RAM), and may also include a secondary memory 610. The secondary memory 610 may include, for example, a hard disk drive 612 and/or a removable storage drive 614, representing a magnetic tape drive, an optical disk drive, etc. The removable storage drive 614 reads from and/or writes to a removable storage unit 618 in a well-known manner. Removable storage unit 618 represents a magnetic tape, optical disk, or other storage medium that is read by and written to by removable storage drive 614. As will be appreciated, the removable storage unit 618 can include a computer usable storage medium having stored therein computer software and/or data.

In alternative implementations, secondary memory 610 may include other means for allowing computer programs or other instructions to be loaded into computer system 102. Such means may include, for example, a removable storage unit 622 and an interface 620. An example of such means may include a removable memory chip (such as an EPROM, or PROM) and associated socket, or other removable storage units 622 and interfaces 620 which allow software and data to be transferred from the removable storage unit 622 to computer system 102.

Computer system 102 may also include one or more communications interfaces, such as communications interface 624. Communications interface 624 allows software and data to be transferred between computer system 102 and external devices. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path (i.e., channel) 626. This channel 626 carries signals 628 and may be implemented using wire or cable, fiber optics, an RF link and other communications channels. In an embodiment of the invention, signals 628 comprise data packets sent to processor 604. Information representing processed packets can also be sent in the form of signals 628 from processor 604 through communications path 626.

The terms "computer program medium" and "computer usable medium" are used to generally refer to media such as removable storage units 618 and 622, a hard disk installed in hard disk drive 612, and signals 628, which provide software to the computer system 102.

Computer programs are stored in main memory 608 and/or secondary memory 610. Computer programs may also be received via communications interface 624. Such computer programs, when executed, enable the computer system 102 to implement the present invention as discussed herein. In particular, the computer programs, when executed, enable the processor 604 to implement the present invention. Where the invention is implemented using software, the software may be stored in a computer program product and loaded into computer system 102 using removable storage drive 614, hard drive 612 or communications interface 624.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for managing computer resources comprising:
a computer system running an operating system;
a system scheduler managing resource allocation for processes using an API;
an add-on scheduler for managing the resource allocation within groups of processes without notifying the operating system, wherein the groups of processes exist only with reference to the add-on scheduler and not as an operating system concept,
wherein the add-on scheduler is implemented in user space;
a plurality of user processes running on the computer system,
wherein the user processes are grouped into at least two logical groups by the add-on scheduler without notifying the operating system, and
wherein the groups of processes are capable of being dynamically modified by the add-on scheduler;
a first set of parameters used by the add-on scheduler for managing the resource allocation within the groups of processes, with the resource allocations being adjusted using the first set of parameters,
wherein the first set of parameters is not supported by the system scheduler;
a second set of parameters used by the system scheduler for managing the resource allocation;
wherein the add-on scheduler reallocates resources restrictions based on (a) a request for resources beyond an established limit, (b) a group resource consumption being a sum of resource consumptions of each process belonging to that group, and (c) based on a predictive algorithm such that the resources are allocated in advance of an actual request for the resources,
wherein the resources restrictions include soft limits,
wherein the add-on scheduler reduces values of the resource restrictions available to a particular process based on any of a history of consumption of the resource by that process and a history of consumption of other resources by that process, and
wherein the add-on scheduler reallocates relative resource allocation between processes within the group of processes, without increasing total resource allocation to the group of processes.

2. The system of claim 1, wherein at least one of the processes comprises a plurality of threads.

3. The system of claim 1, wherein the manager is capable of performing a forced reallocation of the resource from one user to another.

4. The system of claim 1, wherein the add-on scheduler controls restrictions for resources of a renewable type.

5. The system of claim 4, wherein the resources of the renewable type comprise any of network bandwidth, number of network connections, I/O bandwidth for devices, number of operations in a period of time for service operation with countable requests for service, number of operations in a period of time for a daemon with countable requests for service, permission for execution of operation, number of security descriptors, and number of pseudo terminals.

6. The system of claim 1, wherein the add-on scheduler controls restrictions for resources of a non-renewable type.

7. The system of claim 6, wherein the resources of the non-renewable type comprise any of disk space, storage space, number of files, number of operating system service structures for servicing user requests, buffer size, network traffic, number of users, number of groups of users, virtual memory, physical memory and swap file size.

8. The system of claim 1, wherein the add-on scheduler also reallocates the resources restrictions based on weighting of the processes.

9. The system of claim 1, wherein the add-on scheduler adjusts by increasing or decreasing values of the resource restrictions available to a particular process.

10. The system of claim 1, wherein the add-on scheduler increases a resource restriction value to one process by waiting for that resource to become available.

11. The system of claim 1, wherein the add-on scheduler reallocates a resource restriction value to one process by reducing resource restrictions to other processes in the same group on a basis proportional to their current utilization level of that resource.

12. The system of claim 1, wherein the add-on scheduler reduces a resource restrictions allocation to a particular process based on any of a command from the operating system, a current consumption level of the resource by that process, a history of consumption of the resource by that process, a level of consumption of other resources by that process, and a history of consumption of other resources by that process.

13. The system of claim 1, further comprising a storage of the resource restrictions accessible by the add-on scheduler.

14. The system of claim 13, wherein the storage is any of a database, a data in a computer memory, and file on a disk.

15. The system of claim 1, wherein the resources restrictions include limitations on resource use.

16. The system of claim 15, wherein the limitations include hard limits.

17. The system of claim 1, wherein the resources restrictions include guarantees of available resources.

18. The system of claim 17, wherein the guarantees include relaxed guarantees.

19. A method of managing computer resources comprising:

on a computer system running an operating system, starting a system scheduler managing resource allocation for processes using an API;

starting an add-on scheduler for managing the resource allocation within groups of processes without notifying the operating system, wherein the groups of processes exist only with reference to the add-on scheduler and not as an operating system concept, wherein the add-on scheduler is implemented in user space;

launching a plurality of user processes running on the computer system, grouping the user processes into at least two logical groups by the add-on scheduler without notifying the operating system, wherein the groups of processes are capable of being dynamically modified by the add-on scheduler;

utilizing a first set of parameters by the add-on scheduler for managing the resource allocation within the groups of processes, with the resource allocations being adjusted using the first set of parameters, wherein the first set of parameters is not supported by the system scheduler;

utilizing a second set of parameters used by the system scheduler for managing the resource allocation;

using the add-on scheduler, reallocating the resources restrictions based on (a) a request for resources beyond an established limit, (b) a group resource consumption being a sum of resource consumptions of each process belonging to that group, and (c) based on a predictive algorithm such that the resources are allocated in advance of an actual request for the resources, wherein the restrictions include soft limits, using the add-on scheduler reducing values of the resource restrictions available to a particular process based on any of a history of consumption of the resource by that process and a history of consumption of other resources by that process, and using the add-on scheduler, reallocating relative resource allocation between processes within the group, without increasing total resource allocation to the group.

20. The method of claim 19, wherein at least one of the processes comprises a plurality of threads.

21. The method of claim 19, wherein at least one of the processes is a thread.

22. The method of claim 19, wherein the resources are of a renewable type.

23. The method of claim 22, wherein the resources of the renewable type comprise any of network bandwidth, number of network connections, I/O bandwidth for devices, number of operations in a period of time for service operation with countable requests for service, number of operations in a period of time for a daemon with countable requests for service, permission for execution of operation, number of security descriptors, and number of pseudo terminals.

24. The method of claim 19, wherein the resources are of a non-renewable type.

25. The method of claim 24, wherein the resources of the non-renewable type comprise any of disk space, storage space, number of files, number of operating system service structures for servicing user requests, buffer size, network traffic, number of users, number of groups of users, virtual memory, physical memory and swap file size.

26. The method of claim 19, further comprising reallocating the resources restrictions based on a request for resources beyond an established limit.

27. The method of claim 19, further comprising reallocating the resources restrictions based on weighting of the processes.

28. The method of claim 19, further comprising reallocating the resources restrictions so as to increase the resources restriction value available to a particular process while keeping the total resource restrictions to the group to which that process belongs constant.

29. The method of claim 19, further comprising increasing a resource restriction value to one process by waiting for that resource to become available.

30. The method of claim 19, further comprising increasing a resource restriction value to one process by reducing resource restrictions to other processes in the same group on a basis proportional to their current utilization level of that resource.

31. The method of claim 19, further comprising reducing a resource restrictions allocation to a particular process based on any of a command from the operating system, a current consumption level of the resource by that process, a history of consumption of the resource by that process, a level of consumption of other resources by that process, and a history of consumption of other resources by that process.

32. The method of claim 19, wherein the resources restrictions include limitations on resource use.

33. The method of claim 32, wherein the limitations include hard limits.

34. The method of claim 19, wherein the resources restrictions include guarantees of available resources.

35. The method of claim 34, wherein the guarantees include relaxed guarantees.

36. A computer program product for managing computer resources, the computer program product comprising a computer useable storage medium having computer program logic recorded thereon for controlling at least one processor, the computer program logic comprising computer code for implementing the method of claim 19.

37. The computer program product of claim 36, wherein the resources are of a renewable type.

38. The computer program product of claim 37, wherein the resources of the renewable type comprise any of network bandwidth, number of network connections, I/O bandwidth for devices, number of operations in a period of time for service operation with countable requests for service, number of operations in a period of time for a daemon with countable requests for service, permission for execution of operation, number of security descriptors, and number of pseudo terminals.

39. The computer program product of claim 36, wherein the resources are of a non-renewable type.

40. The computer program product of claim 39, wherein the resources of the non-renewable type comprise any of disk space, storage space, number of files, number of operating system service structures for servicing user requests, buffer size, network traffic, number of users, number of groups of users, virtual memory, physical memory and swap file size.

41. The computer program product of claim 36, further comprising computer program code means for reallocating the resources restrictions based on a request for resources beyond an established limit.

42. The computer program product of claim 36, further comprising computer program code means for reallocating the resources restrictions based on any of a predictive algorithm, on process priority, and on weighting of the processes.

43. The computer program product of claim 36, further comprising computer program code means for reallocating the resources restrictions so as to increase the resources restriction value available to a particular process while keeping the total resource restrictions to the group to which that process belongs constant.

44. The computer program product of claim 36, further comprising computer program code means for increasing a resource restriction value to one process by waiting for that resource to become available.

45. The computer program product of claim 36, further comprising computer program code means for increasing a resource restriction value to one process by reducing resource restrictions to other processes in the same group on a basis proportional to their current utilization level of that resource.

46. The computer program product of claim 36, further comprising computer program code means for reducing a resource restrictions allocation to a particular process based on any of a command from the operating system, a current consumption level of the resource by that process, a history of consumption of the resource by that process, a level of consumption of other resources by that process, and a history of consumption of other resources by that process.

47. The computer program product of claim 36, wherein the resources restrictions include limitations on resource use.

48. The computer program product of claim 47, wherein the limitations include hard limits.

49. The computer program product of claim 36, wherein the resources restrictions include guarantees of available resources.

50. The computer program product of claim 49, wherein the guarantees include relaxed guarantees.

* * * * *